US012594719B2

(12) United States Patent
Safavieh et al.

(10) Patent No.: US 12,594,719 B2
(45) Date of Patent: Apr. 7, 2026

(54) HIGH DENSITY MESH FOR INVERTED 3D PRINTING

(71) Applicant: Lung Biotechnology PBC, Silver Spring, MD (US)

(72) Inventors: Mohammadali Safavieh, Nashua, NH (US); Akarsh Sivaprasad, Nashua, NH (US); Mora Melican, Weston, NH (US); Masoud Modaresifar, Manchester, NH (US); Datta Saravana Kalyan Kumar Vydiam, Manchester, NH (US); Barbara Nsiah, Manchester, NH (US); Derek Morris, Bedford, NH (US); Luis Alvarez, Lexington, MA (US)

(73) Assignee: Lung Biotechnology PBC, Silver Spring, MD (US)

( * ) Notice: Subject to any disclaimer, the term of this patent is extended or adjusted under 35 U.S.C. 154(b) by 97 days.

(21) Appl. No.: 18/108,904

(22) Filed: Feb. 13, 2023

(65) Prior Publication Data

US 2023/0256672 A1 Aug. 17, 2023

Related U.S. Application Data

(60) Provisional application No. 63/309,824, filed on Feb. 14, 2022.

(51) Int. Cl.
B29C 64/245 (2017.01)
B33Y 30/00 (2015.01)
(Continued)

(52) U.S. Cl.
CPC ............ B29C 64/245 (2017.08); B33Y 30/00 (2014.12); *B29C 64/124* (2017.08); *B33Y 10/00* (2014.12)

(58) Field of Classification Search
CPC ..... B29C 64/245; B29C 64/124; B33Y 30/00; B33Y 10/00
See application file for complete search history.

(56) References Cited

U.S. PATENT DOCUMENTS

2019/0134888 A1* 5/2019 DeSimone .............. B29C 64/40
2019/0160734 A1* 5/2019 Biesboer ................ C08L 23/06
(Continued)

FOREIGN PATENT DOCUMENTS

WO WO-2020/185692 A9 9/2020
WO WO-2022/046719 3/2022
(Continued)

OTHER PUBLICATIONS

Guide to Stereolithography (SLA) 3D Printing, Formlabs, https://formlabs.com/blog/ultimate-guide-to-stereolithography-sla-3d-printing/ [accessed Jan. 6, 2022].
(Continued)

*Primary Examiner* — JaMel M Nelson
*Assistant Examiner* — Erica Hartsell Funk
(74) *Attorney, Agent, or Firm* — Foley & Lardner LLP

(57) ABSTRACT

A platform form an apparatus for printing a 3D model comprises a base and a print layer. The base has a first side where the first side of the base has a first surface roughness thereon. The print layer is coupled first side of the base and includes a surface. The surface of the print layer is distal from the base and has a second surface roughness which is greater than the first surface roughness so as to promote adhesion of the 3D model being printed on the platform.

16 Claims, 11 Drawing Sheets

(51) Int. Cl.
  *B29C 64/124* (2017.01)
  *B33Y 10/00* (2015.01)

(56) References Cited

U.S. PATENT DOCUMENTS

| | | |
|---|---|---|
| 2022/0055289 A1 | 2/2022 | Safavieh et al. |
| 2022/0354954 A1 | 11/2022 | Melican et al. |
| 2022/0355541 A1 | 11/2022 | Melican et al. |
| 2022/0356433 A1 | 11/2022 | Modaresifar et al. |
| 2022/0370188 A1 | 11/2022 | Kaur et al. |
| 2022/0371268 A1 | 11/2022 | King et al. |
| 2022/0389374 A1 | 12/2022 | Kaur et al. |
| 2023/0158735 A1* | 5/2023 | Hughes .................. B32B 5/022 |
| | | 428/311.51 |

FOREIGN PATENT DOCUMENTS

| | | |
|---|---|---|
| WO | WO-2022/236030 | 11/2022 |
| WO | WO-2022/236061 | 11/2022 |
| WO | WO-2022/236103 | 11/2022 |
| WO | WO-2022/236116 | 11/2022 |
| WO | WO-2022/236119 | 11/2022 |
| WO | WO-2022/236125 | 11/2022 |

OTHER PUBLICATIONS

Makhsin et al., Surface modification of titanium-coated glass substrate embedded acrylate-based hydrogel film for optical metal clad leaky waveguide (MCLW) biosensors. IEEE Sensors 2017 (vol. INSPEC Accession No. 17434441).

* cited by examiner

Providing a 3D printer Assembly 202

Providing a Platform 204

Coupling the Platform to the 3D Printer Assembly 206

Operating the 3D Printer Assembly 208

200

400

HIGH DENSITY MESH FOR INVERTED 3D PRINTING

CROSS-REFERENCE TO RELATED APPLICATIONS

The present application claims priority to U.S. provisional patent application No. 63/309,824 filed Feb. 14, 2022, which is incorporated herein by reference in its entirety.

FIELD

The present invention relates generally to the field of apparatuses and methods for 3D models and specifically, 3D printing artificial organs and scaffolds for tissue engineering.

BACKGROUND

It is generally desirable to produce artificial organs and scaffolds for tissue engineering with a high degree of control and consistency to prevent functional defects. Generally, artificial organs and scaffolds for tissue engineering are formed on a platform and the adhesion of the organ to the platform is an important factor in achieving a successful result. One approach to increase adhesion is to chemically modify the platform with chemicals such as saline methacrylate. However, this approach is time consuming as the chemical process needs to be repeated every time a new artificial organ needs to be formed and inconsistencies in the printed product may result from inconsistency of chemical modification.

SUMMARY

One embodiment is a printing platform for an apparatus for printing a 3D model, comprising: a base, and a mesh of a first side of the base, wherein an adhesion strength between a photocurable ink to the mesh is greater than an adhesion strength of the photocurable ink to an oxygen permeable membrane of the apparatus.

Another embodiments is an apparatus for printing a 3D model, comprising: a vat configured to store a photocurable ink, wherein a bottom of the vat comprises an oxygen permeable membrane, and a printing platform comprising: a base, and a mesh of a first side of the base, wherein an adhesion strength between a photocurable ink to the mesh is greater than an adhesion strength of the photocurable ink to the oxygen permeable membrane, wherein the platform is configured to be displaced from the oxygen permeable membrane to form a 3D model from the photocurable ink.

Yet another embodiment is a method of forming a 3D printed model comprising: providing an apparatus comprising: a vat with a photocurable ink, wherein a bottom of the vat comprises an oxygen permeable membrane; and a printing platform comprising: a base, and a mesh of a first side of the base, wherein an adhesion strength between a photocurable ink to the mesh is greater than an adhesion strength of the photocurable ink to the oxygen permeable membrane; and displacing the printing platform from the oxygen permeable membrane to form a 3D model from the photocurable ink.

Yet another embodiment relates to a platform for an apparatus for printing a 3D model. The platform comprises a base and a print layer. The base has a first side where the first side of the base has a first surface roughness thereon. The print layer is coupled to the first side of the base and includes a surface. The surface of the print layer is distal from the base and has a second surface roughness that is greater than the first surface roughness to promote adhesion of the 3D model being printed on the platform.

And yet another embodiment relates to an apparatus for printing a 3D model. The apparatus comprises of a 3D printer assembly and a platform. The 3D printer assembly comprises a printer head configured to utilize a material to print the 3D model, a vat or other reservoir configured to store the material utilized by the printer head ("vat" as used herein), an actuator, and a platform mounting structure coupled to the actuator. The actuator is configured to displace the platform mounting structure along an axis. The platform is coupled to the actuator via the platform mounting structure and is configured to receive the material. The platform comprises a base and a print layer. The base has a first side where the first side of the base has a first surface roughness thereon. The print layer is coupled first side of the base and includes a surface. The surface of the print layer is distal from the base and has a second surface roughness which is greater than the first surface roughness to promote adhesion of the 3D model being printed on the platform.

Yet another embodiment relates to a method of forming a 3D printed model comprising providing a 3D printer assembly. The 3D printer assembly comprises a printer head configured to utilize a material to print the 3D model, a vat configured to store the material utilized by the printer head, an actuator, and a platform mounting structure coupled to the actuator. The actuator is configured to displace the platform mounting structure along an axis. The method further comprises of providing a platform comprising a base and a print layer. The base has a first side where the first side of the base has a first surface roughness thereon. The print layer is coupled first side of the base and includes a surface. The surface of the print layer is distal from the base and has a second surface roughness which is greater than the first surface roughness so as to promote adhesion of the 3D model being printed on the platform. The platform is coupled to 3D printer assembly and the 3D printer assembly is operated such that the material utilized by the printer head and coupled to the platform to form a 3D model.

FIGURES

Figure 1:
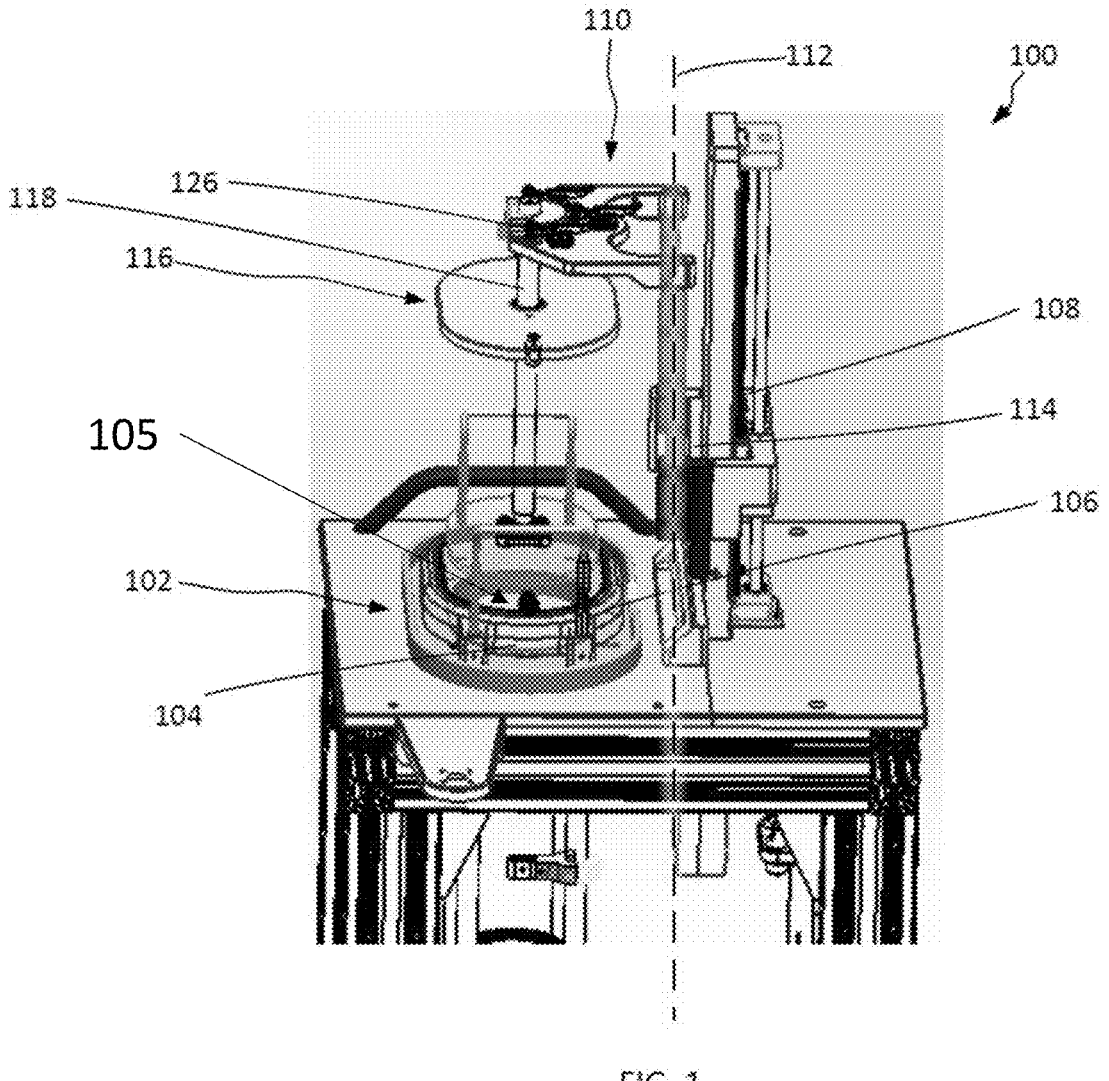
FIG. 1 is a perspective view of an apparatus for printing a 3D model.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION

Unless otherwise specified, "a" or "an" means "one or more."

All numerical designations, e.g., amount, time, and concentration, including ranges, are approximations which are varied (+) or (−) by increments of 0.05%, 1%, 2%, 5%, 10% or 20%. It is to be understood, although not always explicitly stated that all numerical designations are preceded by the term "about."

RELATED APPLICATIONS

The following patent documents, each of which is incorporated herein by reference in its entirety, may be useful for understanding this application: U.S. Patent Application Publications Nos: 2022-0370188; 2022-0389374; 2022-0356433; 2022-0371268; 2022-0354954; 2022-0355541; 2022-0055289; PCT Patent Application Publications Nos. WO2022/236030; WO2022/236061; WO2022/236119; WO2022/236116; WO2022/236125; WO2022/236103; WO2022/046719.

Embodiments described herein relate generally to an apparatus and method for 3D printing a 3D model. In preferred embodiments, the 3D model is an artificial organ, or portion thereof, or a scaffold for tissue engineering. The scaffold for tissue engineering may be used to form an artificial organ or portion thereof, or it may be used for other applications. In some embodiments, the tissue for scaffold engineering may be used to support the growth of one or more cell types and can be intended for implantation in a subject, including a human subject. For ease of reference, as used herein "artificial organ" can include artificial organs and portions thereof as well as scaffolds for tissue engineering. Thus, for example, a process for producing an artificial organ can also be used to produce a scaffold for tissue engineering, unless otherwise indicated. The apparatus and method described here in utilize a 3D printer assembly and a platform including a print layer to ensure adhesion of the 3D model to the platform during the printing process.

Artificial organs can be used for transplants, education and research purposes, and inspection as to transplant viability. There is a demand for artificial organs for both transplant and research purposes given the limited supply of organs, ethical concerns, and the high cost of procuring and handling organs. 3D printing techniques can be used to form artificial organs or tissue scaffolds. Typically, 3D-printed artificial organs are formed on platforms which have been chemically modified to increase adhesion, for example, chemically modifying the platform with chemicals such as saline methacrylate. However, this process may increase the time needed to form the artificial organ, as the platform needs to be cleaned and re-chemically modified between each artificial organ formation. This cleaning and/or chemical treatment can be complicated or costly depending on manufacturing requirements and processes. Additionally, the artificial organ once formed may need to go through additional process to clean any chemical residue that could lead to damage of the artificial organ. Lastly, current methods used to form artificial organs yield a low success rate, in part because of the inaccuracies which occur during formation. For example, as an artificial organ is being formed, the material used for the artificial organ may shift due to the low adhesion strength to the platform. Poor adhesion is a significant problem in an applications requiring a high degree of accuracy or resolution, such as printing analogs of fine biological structures. Examples of such structures include small blood vessels and the sub-bronchi structures of the lung, bronchioles and alveoli.

In contrast, the apparatus and method for forming a 3D model as described herein, which includes forming the 3D model on a platform including a base and a print layer, may provide one or more benefits including, such as (1) reducing the time needed form multiple 3D models, (2) increasing adhesion between the 3D model and the platform during the formation process; (3) increasing accuracy and resolution relative to other methods, (4) forming substantially defect free 3D models; and (5) forming large, heavy 3D models that are otherwise unable to be printed.

Referring to FIG. 1, an apparatus 100 for printing a 3D model is shown according to some embodiments. The apparatus may be similar to 3D-pinting apparatuses disclosed in PCT application publication No. Wo2022/046719, U.S. Patent Application Publications Nos. 2022-0055289 and 2022-0356433, each of which is incorporated herein by reference in its entirety. Specifically, the apparatus may be similar to the apparatus illustrated on FIG. 2 of US 2022-0356433 or FIG. 5 of Wo2022/046719.

The apparatus 100 includes a container, such as a vat 106, which may contain a photosensitive liquid, such as a photocurable ink. The container, such as a vat 106, may include an oxygen permeable membrane 105 at its bottom. The oxygen permeable membrane 105 may be formed from a fluoropolymer, such as polytetrafluoroethylene or perfluoro. The oxygen permeable membrane 105 may have an oxygen permeability of at least $100 \times 10^{-10}$ cm$^3$ (STP) cm/(cm$^2$ s cm Hg) or at least $200 \times 10^{-10}$ cm$^3$ (STP) cm/(cm$^2$ s cm Hg) or at least $400 \times 10^{-10}$ cm$^3$ (STP) cm/(cm$^2$ s cm Hg) or at least $600 \times 10^{-10}$ cm$^3$ (STP) cm/(cm$^2$ s cm Hg) or at least $800 \times 10^{-10}$ cm$^3$ (STP) cm/(cm$^2$ s cm Hg) or at least $1000 \times 10^{-10}$ cm$^3$ (STP) cm/(cm$^2$ s cm Hg) or at least $1200 \times 10^{-10}$ cm$^3$ (STP) cm/(cm$^2$ s cm Hg) or at least $1400 \times 10^{-10}$ cm$^3$ (STP) cm/(cm$^2$ s cm Hg) or at least $1600 \times 10^{-10}$ cm$^3$ (STP) cm/(cm$^2$ s cm Hg). In some embodiments, the oxygen permeable membrane 105 may be formed from TEFLON AF 1600™ or TEFLON AF 2400™ fluoropolymer.

The apparatus includes a radiation source under the container, such as a vat 106. The radiation source is configured to irradiate the photosensitive liquid, such as a photocurable ink, thereby converting the photosensitive liquid, such as a photocurable ink, into a solid polymer, such as a photocured and/or crosslinked polymer to form a 3D-model.

The apparatus 100 includes a platform 116. Platform 116 is configured to be immersed into the container, such as vat 106, and then to be translationally displaced from the oxygen permeable membrane 105 at the bottom the container, such as vat 106, while the 3D-model is formed. The radiation source irradiates portions of the photosensitive liquid, such as a photocurable ink, thereby forming consequent layers of the solid polymer, such as a photocured and/or crosslinked polymer, from portions of the photosensitive liquid, such as a photocurable ink, between the platform and the oxygen permeable membrane.

Platform 116 includes base 118. Base 118 has first side or surface 120. During forming the 3D model, first side or surface 120 may be parallel or essentially parallel to the oxygen permeable membrane 105 at the bottom of the container, such as vat 106.

Figure 4:
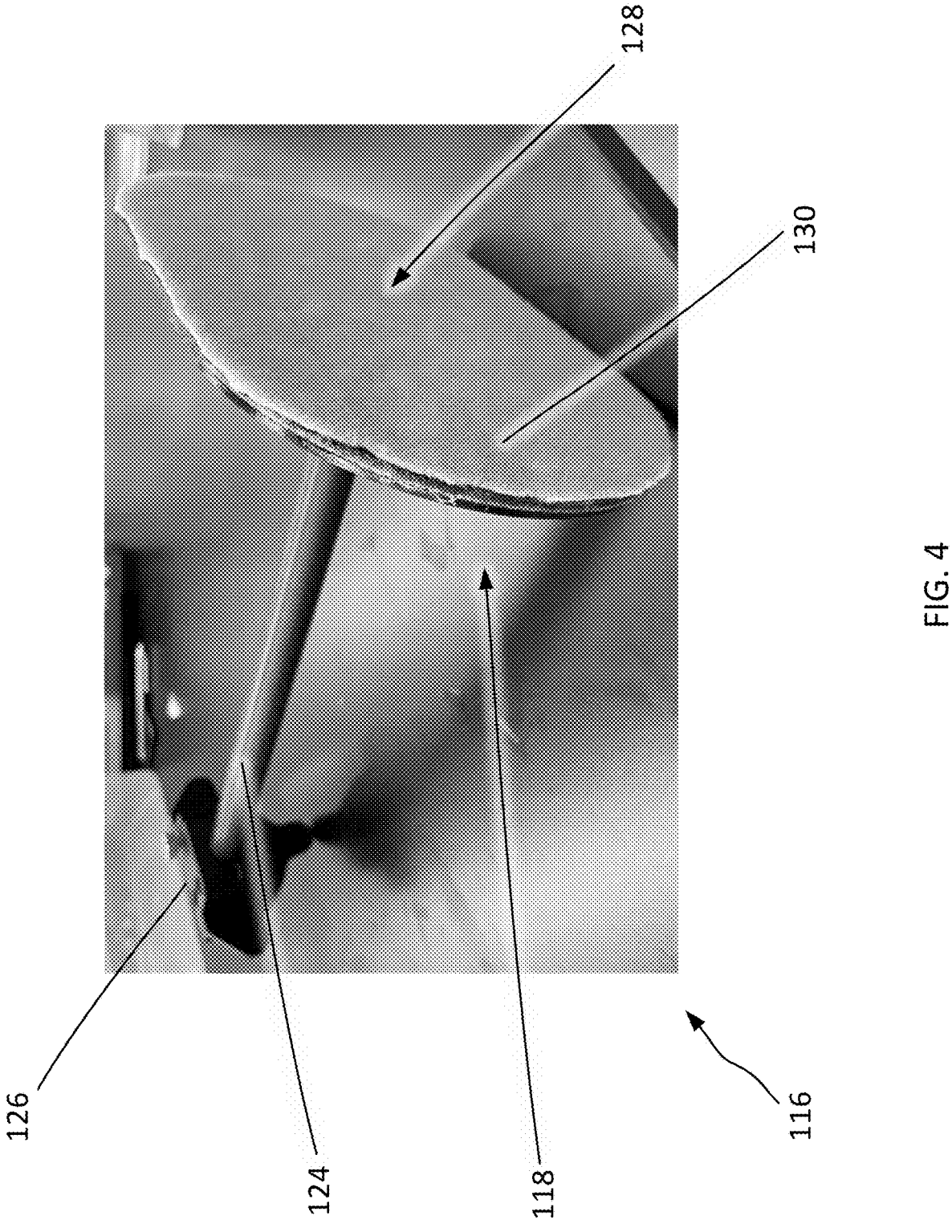
FIG. 4 is a schematic illustration of a platform, according to one embodiment.

First side or surface 120 of base 118 is covered by a mesh material or a mesh, such as mesh 128 in FIG. 4. As used herein, "mesh" may refer to a woven, knit, or knotted material of open texture with holes, which may or may not be evenly spaced. The mesh material, such as mesh 128, has a high surface area. For forming the 3D model, an adhesion strength between the photosensitive liquid, such as a photocurable ink, and the mesh may be greater than an adhesion strength between the photosensitive ink and the oxygen permeable membrane at the bottom of the container, such as vat 106. Also an adhesion strength between the solid polymer, such as a photocured and/or crosslinked polymer, formed from the photosensitive fluid, such as a photocurable ink, by irradiation from the radiation source under the container, such as vat 106, may be greater than an adhesion strength between the photosensitive fluid, such as a photocurable ink, and the oxygen permeable membrane at the bottom of the container, such as vat 106.

The mesh material, such as mesh 128, in first side 120 of base 118 may be a mesh formed from a metal, such as titanium, copper, or aluminum, a polymer, such as, for example, cellulose. Non limiting examples of the mesh material may include a hook and loop material, Velcro®, cellulose paper, metallic titanium mesh.

In some embodiments, first surface 120 of base 118 may have surface roughness to facilitate attachment of the mesh material, such as mesh 128. In some embodiments, the mesh material, such as mesh 128, may be attached to base 118 using an adhesive layer between first surface 120 of base 116 and the mesh material. In some embodiments, the mesh material, such as mesh 128, may be attached to base 118 using an adhesive layer between first surface 120 having surface roughness and the mesh material.

Base 118 may be formed from a number of materials. For example, base 118 may be formed from a metal, such as, for example, aluminum, titanium, steel, a polymer, such as a plastic or a resin, or any other suitable material used to form a base.

Base 118 further includes a second base side 122. Second base side 122 is opposite of the first base side 120. The platform 116 includes a mounting arm 124. The mounting arm 124 is coupled at one end to the second base side 122. The mounting arm 124 extends from the second base side 122 to a distal end. The platform 116 includes a mounting structure 126. The mounting structure 126 is s coupled to the to the distal end of the mounting arm 124. By this way, the platform 116 is coupled to the mounting structure 126.

In some embodiments, the first base side 120 may have a first base side surface roughness (e.g., first surface roughness, etc.). In some embodiments, the first base side surface roughness of the first base side 120 may be the surface roughness of the material used to form the base 118. In some embodiments, the first base side surface roughness is defined by a hook and loop material. The hook and loop material is configured to cause adhesion. The base 118 further includes a second base side 122. The second base side 122 is opposite of the first base side 120. The platform 116 includes a mounting arm 124. The mounting arm 124 is coupled at one end to the second base side 122. The mounting arm 124 extends from the second base side 122 to a distal end. The platform 116 includes a mounting structure 126. The mounting structure 126 is coupled to the to the distal end of the mounting arm 124. By this way, the platform 116 is coupled to the mounting structure 126.

The mounting structure 126 couples to the mounting structure rod 114. By this way, the mounting structure 126 is coupled to the platform mounting structure 110 and the platform 116 is coupled to the 3D printer assembly 102. In operation, as the actuator 108 is operated, the mounting structure rod 114 is displaced causing the mounting structure 126 to be displaced. As the mounting structure 126 is displaced, the platform 116 is caused to be displaced in a vertical direction and/or a direction perpendicular to a surface of the photocurable ink in the vat 106 (or a surface of the oxygen permeable membrane 105 at the bottom of the vat 106) and parallel with the platform mounting axis 112. The platform 116 may be displaced so as to move toward and away from the vat 106.

In some embodiments, a photosensitive fluid, such as a photocurable ink, may contain one or more monomers and/or polymers to be crosslinked upon the irradiation from the radiation source, such as the one underneath the vat 106, and one or more crosslinkers, monomers. The photosensitive fluid, such as a photocurable ink, may further include a photoinitiator to initiate a crosslinking reaction upon the irradiation from the radiation source, which reaction would result in formation of a solid polymer, such as a photocured and/or crosslinked polymer, from the photosensitive fluid. The photosensitive fluid, such as a photocurable ink, may also include a dye absorbing the irradiation from the radiation source. The The photosensitive fluid, such as a photocurable ink, may also include 10%-90% water.

In some embodiments, a photosensitive fluid, such as a photocurable ink, may be a photosensitive fluid disclosed in one or more of US 2022-0370188, US 2022-0356433, US 2022-355541; US2022-389374; US 2022-0371268; US 2022-0354954, each of which is incorporated by reference in its entirety. In some embodiments, the photosensitive fluid, such as a photocurable ink, may be a bioink, which may be biocompatible. In some embodiments, the photosensitive fluid, such as a photocurable ink may be used for printing a 3D model, which may be a bioscaffold, such as the one disclosed in one or more of US 2022-0370188, US 2022-0356433, US 2022-355541; US2022-389374; US 2022-0371268; US 2022-0354954. In some embodiments, the 3D model may be an artificial organ (e.g. lung, liver, kidney, heart, a portion of the heart, etc. or a scaffold for tissue engineering).

The apparatus 100 may be used to print a 3D model. In some embodiments, the apparatus is used to print a 3D model where the 3D model is an artificial organ (e.g. lung, liver, kidney, heart, a portion of the heart, etc. or a scaffold for tissue engineering). The apparatus 100 includes a 3D printer assembly 102 (e.g., digital light projection assembly, stereolithography assembly, selective laser melting assembly, etc.). The 3D printer assembly 102 includes a printer head 104. The printer head 104 is configured to utilize a material (e.g., hydrogel, resin, etc.) to form the 3D model. In some embodiments, the printer head 104 may be a plurality of UV lights which react with the material and cause the material to change from a liquid state to a solid state. In some embodiments, the printer head 104 may be an extruder which is configured to extrude the material to form the 3D model. The 3D printer assembly 102 includes a vat 106. The vat 106 is coupled to the printer head 104. In some embodiments, the vat 106 may be fluidly coupled to the printer head 104. The vat 106 is configured to store the material utilized by the printer head 104. The vat 106 may be coupled (e.g., attached, affixed, adhesively attached, bonded, etc.) to a cartridge dispenser. The cartridge dispenser is configured to refill the vat 106 when the material in the vat 106 has been used. In some embodiments the vat 106 may be manually refilled.

The printer assembly 102 includes an actuator 108 (e.g., linear actuator, linear screw actuator, pneumatic actuator, etc.). The printer assembly 102 includes a platform mounting structure 110. The platform mounting structure 110 is operably coupled to the actuator 108. In operation, the actuator 108 causes the platform mounting structure 110 to be displaced along a platform mounting axis 112. The platform mounting structure 110 includes at least one mounting structure rod 114. The mounting structure rod 114 may lie along the platform mounting axis 112. The mounting structure rod 114 is coupled to the actuator 108 such that as the actuator 108 is operated, the mounting structure rod 114 are displaced along the platform mounting axis 112.

Figure 2:
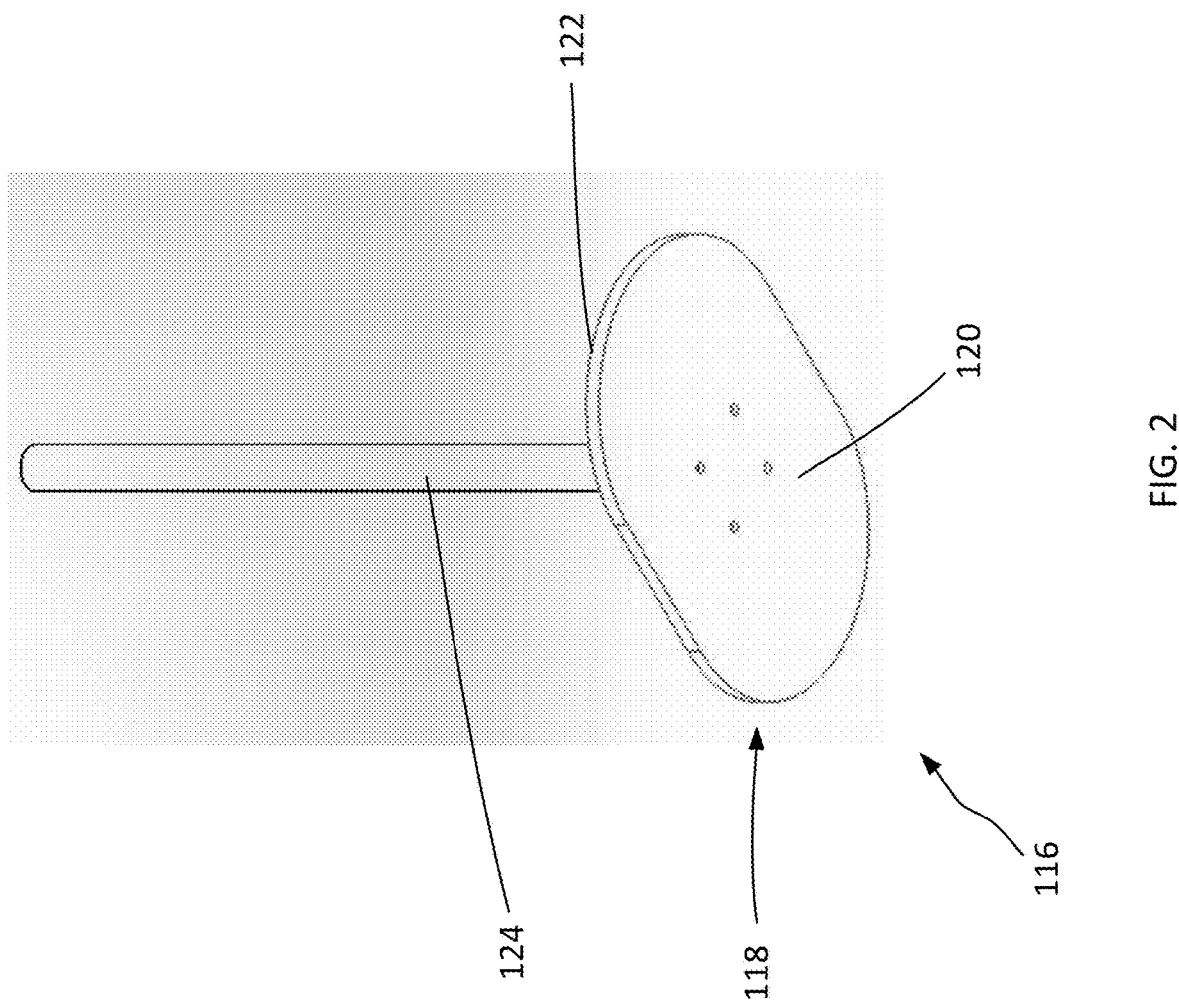
FIG. 2 is a perspective view of a base of a platform for the apparatus for printing a 3D model of FIG. 1.

The apparatus 100 includes a platform 116. Referring to FIGS. 1 and 2, the platform 116, according to one embodiment is shown. The platform 116 includes a base 118. The base 118 may be formed from metal (e.g., aluminum, titanium, steel, etc.), plastic, resin, or any other suitable material used to form a base. The base 118 includes a first base side 120. In some embodiments, the first base side 120 may have a first base side surface roughness (e.g., first surface roughness, etc.). In some embodiments, the first base side surface roughness of the first base side 120 may be the surface roughness of the material used to form the base 118. In some embodiments, the first base side surface roughness is defined by a hook and loop material. The hook and loop material is configured to cause adhesion. The base 118 further includes a second base side 122. The second base side 122 is opposite of the first base side 120. The platform 116 includes a mounting arm 124. The mounting arm 124 is coupled at one end to the second base side 122. The mounting arm 124 extends from the second base side 122 to a distal end. The platform 116 includes a mounting structure 126. The mounting structure 126 is coupled to the distal end of the mounting arm 124. By this way, the platform 116 is coupled to the mounting structure 126.

The mounting structure 126 couples to the mounting structure rod 114. By this way, the mounting structure 126 is coupled to the platform mounting structure 110 and the platform 116 is coupled to the 3D printer assembly 102. In operation, as the actuator 108 is operated, the mounting structure rod 114 is displaced causing the mounting structure 126 to be displaced. As the mounting structure 126 is displaced, the platform 116 is caused to be displaced in a direction perpendicular to the vat 106 and parallel with the platform mounting axis 112. The platform 116 may be displaced so as to move toward and away from the vat 106.

Figure 3:
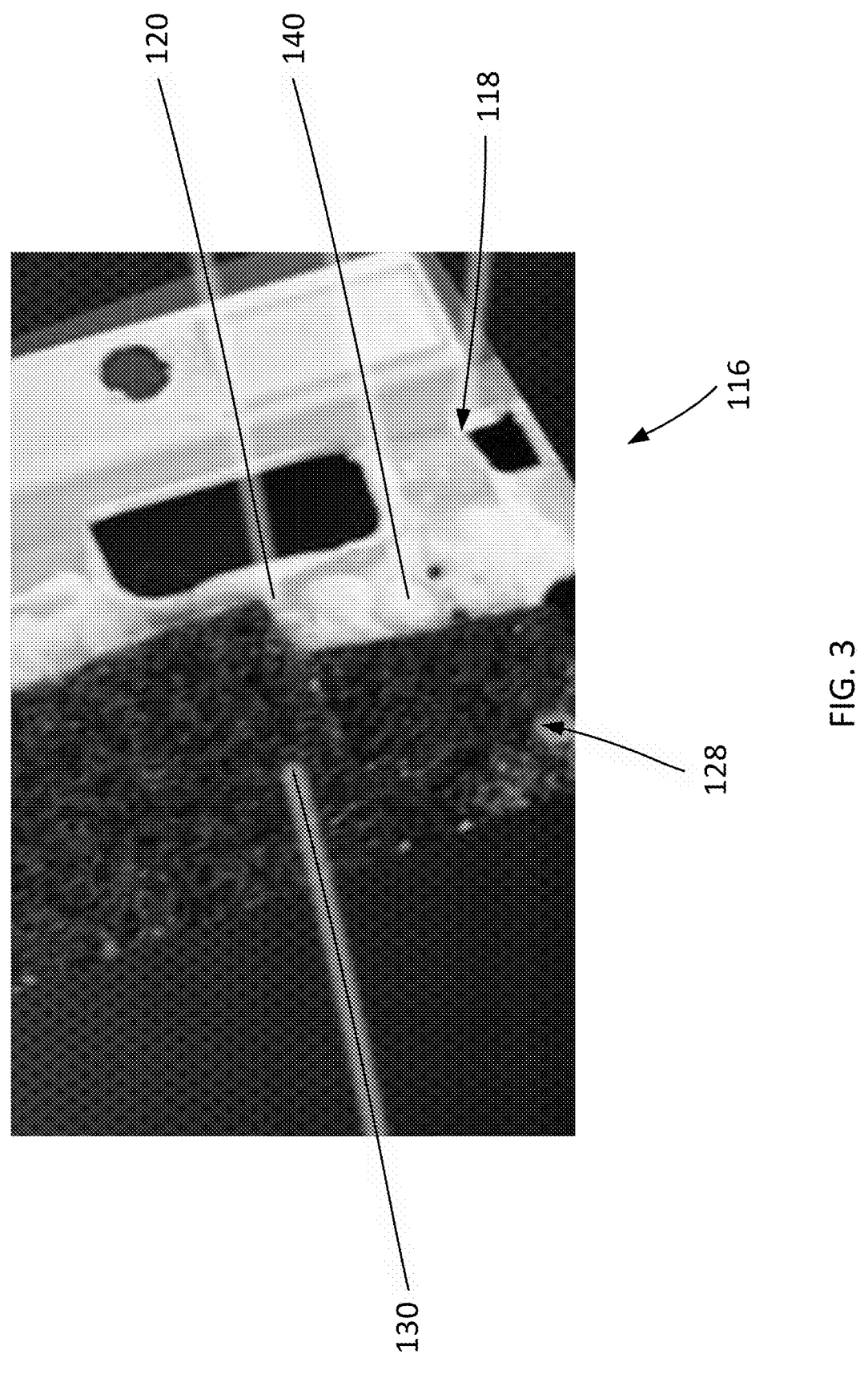
FIG. 3 is a schematic illustration of a platform, according to one embodiment.

Referring to FIGS. 3 and 4, the platform 116, according to one embodiment is shown. The platform 116 comprises a print layer 128. The print layer 128 is configured to receive the 3D model during the printing process. The print layer 128 is coupled at one end to the first base side 120. The print layer 128 includes a print layer surface 130. The print layer surface 130 is distal from the first base side 120 of the base 118. The print layer 128 may be formed form a hook and loop material, Velcro®, cellulose paper, metallic titanium mesh or any similar suitable material that adheres when pressed together. The print layer surface 130 has a print layer surface roughness (e.g., second surface roughness, etc.) defined by the material used to form the print layer 128. The print layer surface roughness of the print layer surface 130 promotes adhesion of the 3D model to the print layer 128 of the platform 116. In some embodiments, the print layer surface roughness is measured using a profilometer (e.g., Taylor Hobson Surface Roughness tester, etc.). The profilometer measures the distance between the microscopic peaks and the valleys of print layer surface 130 over the area of the print layer surface 130. The surface roughness is approximately between 0.5 micrometers (μm) and 20 μm, inclusive (e.g., 0.475 μm, 1.0 μm, 5 μm, 10 μm, 15 μm, 20 μm, 21 μm, etc.). In some embodiments, the print layer surface roughness is greater than the first base side surface roughness. The print layer surface roughness may be in between a range of 50% to 300% greater than the first base side surface roughness (e.g., 47.5%, 50%, 75%, 100%, 125%, 150%, 175%, 200%, 225%, 250%, 275%, 300%, 315%, etc.).

Figure 5:
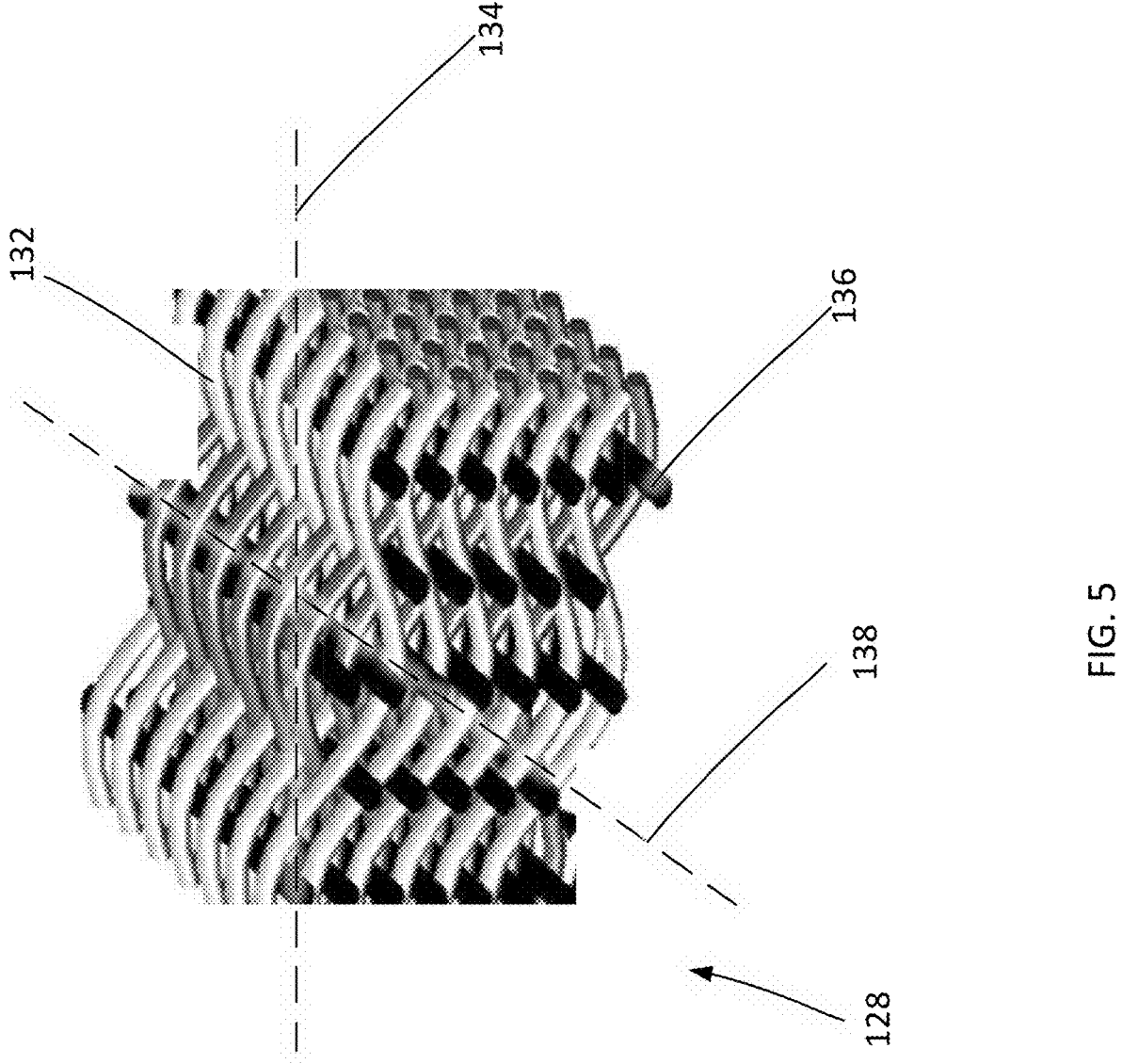
FIG. 5 is a perspective view of a portion of a print layer of a platform, according to one embodiment.

Referring to FIG. 5, a perspective view of a portion of the print layer 128 is shown. In some embodiments the print layer 128 may be formed on the first base side 120. The print layer 128 may be formed in a complex mesh pattern (e.g., woven pattern, etc.). The print layer 128 includes a plurality of first print strips 132. Each of the plurality of first print strips 132 are placed parallel to one another in a direction parallel to a print layer lateral axis 134 on the first base side 120. The print layer 128 includes a plurality of second print strips 136. Each of the plurality of second print strips 136 are placed on the plurality of first print strips 132 parallel to one another and in a direction parallel to a print layer longitudinal axis 138 and perpendicular to the plurality of first print strips 132. In some embodiments, the print layer 128 is formed by placing multiple layers of the plurality of first print strips 132 on the plurality of second print strips 136. Specifically, the plurality of first print strips 132 are placed in a direction parallel to the print layer lateral axis 134 and perpendicular to the plurality of second print strips 136 on the previous layer of the plurality of second print strips 136. The plurality of second print strips 136 are placed in a direction parallel to the print layer longitudinal axis 138 and perpendicular to the plurality of first print strips 132 on the previous layer of first print strips 132. As each of the layers of the plurality of first print strips 132 and the plurality of second print strips 136 are placed, the plurality of first print strips 132 adhere to the plurality of second print strips 136.

In some embodiments, the print layer 128 is formed and coupled to the first base side 120. The print layer 128 may include a coating material (e.g., powdered titanium, etching material, sandblasted titanium etc.). Specifically, once the print layer 128 is formed, a coating material may be applied (e.g., spot coated, sprinkled, dusted, sandblasted, etched, etc.,) to the print layer 128 to assist in promoting adhesion. For example, powdered titanium may be spot coated to the print layer 128. In some embodiments, the print layer 128 may also be sterilized. For example, the print layer 128 may receive a sterilizing agent (e.g., saline solution, etc.) which sterilizes the print layer surface 130. In some embodiments, once the print layer 128 is coupled to the first base side 120, the print layer 128 does not need to be replaced between 3D model formations.

Referring back to FIG. 3, in some embodiments, the platform 116 includes an adhesion layer 140 (e.g., epoxy glue, glue, hooks and loop, Velcro®, barbed shapes, rivet shaped objects, etc.). The adhesion layer 140 is interposed between the first base side 120 and the print layer 128. The adhesion layer 140 is configured to couple the print layer 128 to the base 118. In some embodiments, the adhesion layer 140 couples the print layer 128 to cover the entirety of the first base side 120 and further prevents the print layer 128 from detaching from the first base side. In operation, the adhesion layer 140 is applied to the first base side 120. The plurality of first print strips 132 are placed on the adhesion layer 140 to begin the formation of the print layer 128. The print layer 128 is formed, as described above. The adhesion layer 140 may dry, facilitating the coupling of the print layer 128 to the first base side 120 of the platform 116. In some embodiments, the adhesion layer 140 is integrated into the first base side 120 and is formed from a material comprising of hooks and loops which adhere the print layer 128. For example, the print layer 128 may also be formed from a material comprising hooks and loops and the first base side 120 may formed from a material comprising hooks and loops. When the print layer 128 is pressed onto the first base side 120, the hooks and loops of the print layer 128 couple with the hooks and loops of the first base side 120 to couple the print layer 128 to the base 118.

Figure 6:
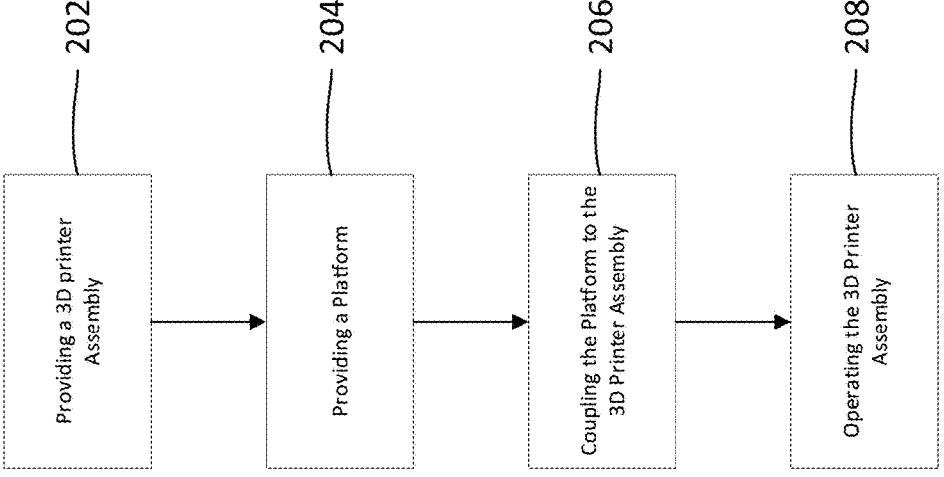
FIG. 6 is a flow chart for a method of forming a 3D printed model.
Figure 6:
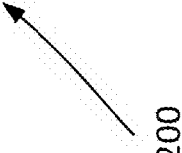

Referring to FIG. 6, a flow chart for a method 200 for forming the 3D printed model, according to one embodiment is shown. At 202, a 3D printer assembly (e.g., 3D printer assembly 102, etc.) is provided. The 3D printer assembly includes a printer head configured to utilize a material to print the 3D model, a vat configured to store the material utilized by the printer head, an actuator, and a platform mounting structure operably coupled to the actuator. The actuator is configured to displace the platform mounting structure along an axis. At 204, a platform (e.g., platform 116, etc.) is provided. At 206, the platform is coupled to the 3D printer assembly. In some embodiments, the platform includes a mounting arm (e.g., mounting arm 124, etc.) which couples to the mounting structure (e.g., mounting structure 126, etc.) of the platform mounting structure (e.g., platform mounting structure 110, etc.) of the 3D printer assembly.

Figure 7:
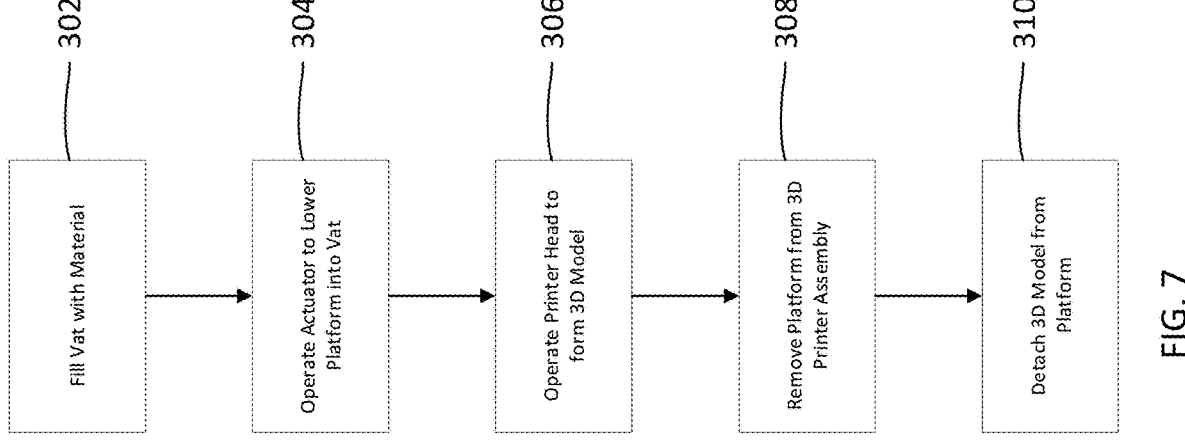
FIG. 7 is a flow chart for a method of operating a printer assembly of the apparatus of FIG. 1, according to one embodiment.

At 208, the 3D printer assembly is operated to print the 3D model. Referring to FIG. 7, the flow chart for the method of operating the 3D printer assembly 208, according to one embodiment is shown. At 302, the vat (e.g., vat 106, etc.) is filled with the material. In some embodiments, the vat is filled with a liquid hydrogel material. In some embodiments, the vat is filled with a liquid resin material. The vat may be filled manually or with a cartridge dispenser. In some embodiments, the cartridge dispenser dispenses the material into the vat. At 304, the actuator is operated to lower the platform into the vat. The actuator is operated to actuate which causes the mounting structure rod (e.g., mounting structure rod 114, etc.) to be displace along an axis (e.g., platform mounting axis 112, etc.). As the mounting structure rod is displaced along an axis, the platform mounting structure which the platform is coupled to, is also displaced. In some embodiments, the platform is displaced into the vat such that the platform is submerged in the material. In some embodiments, the platform is displaced so as to be proximate to the vat and the printer head. At 306, the printer head is operated to form the 3D model. In some embodiments, the printer head may emit a plurality of ultraviolet rays (e.g., ultraviolet light rays, etc.) to the platform which cause the material to change from liquid state to a solid state. In some embodiments, the printer head extrudes material on to the platform. The printer head may include a nozzle in which the material extrudes from. As the printer head is operated to form the 3D model, the actuator operates to raise the platform from the vat to provide clearance between the bottom of the vat and the 3D model being formed. In some embodiments, the 3D model is formed by a plurality of layers of material. For example, the printer head operates to form a first layer of the 3D model on to the platform. The printer head forms a second layer of the 3D model on top of the first layer. The process is repeated until the 3D model is formed. In some embodiments, the 3D model is submerged in the material during the formation process.

At 308, the platform, including the formed 3D model, is decoupled from the 3D printer assembly. In some embodiments, mounting structure is decoupled from the platform mounting structure such that the platform is decoupled form the 3D printer assembly. At 310, the 3D model is decoupled from the platform. In some embodiments, the 3D model is manually decoupled using a decoupling tool so as not to damage the platform or the 3D model. In some embodiments, once the 3D model is detached from the platform, the platform is re-salinized and may be recoupled to 3D printer assembly such that method 300 may be repeated. By this way, the time for the process of forming multiple 3D models is reduced. For example, the after removing the formed 3D model from the platform, the platform can be quickly re-salinized and recoupled to the 3D printer assembly.

Figure 8:
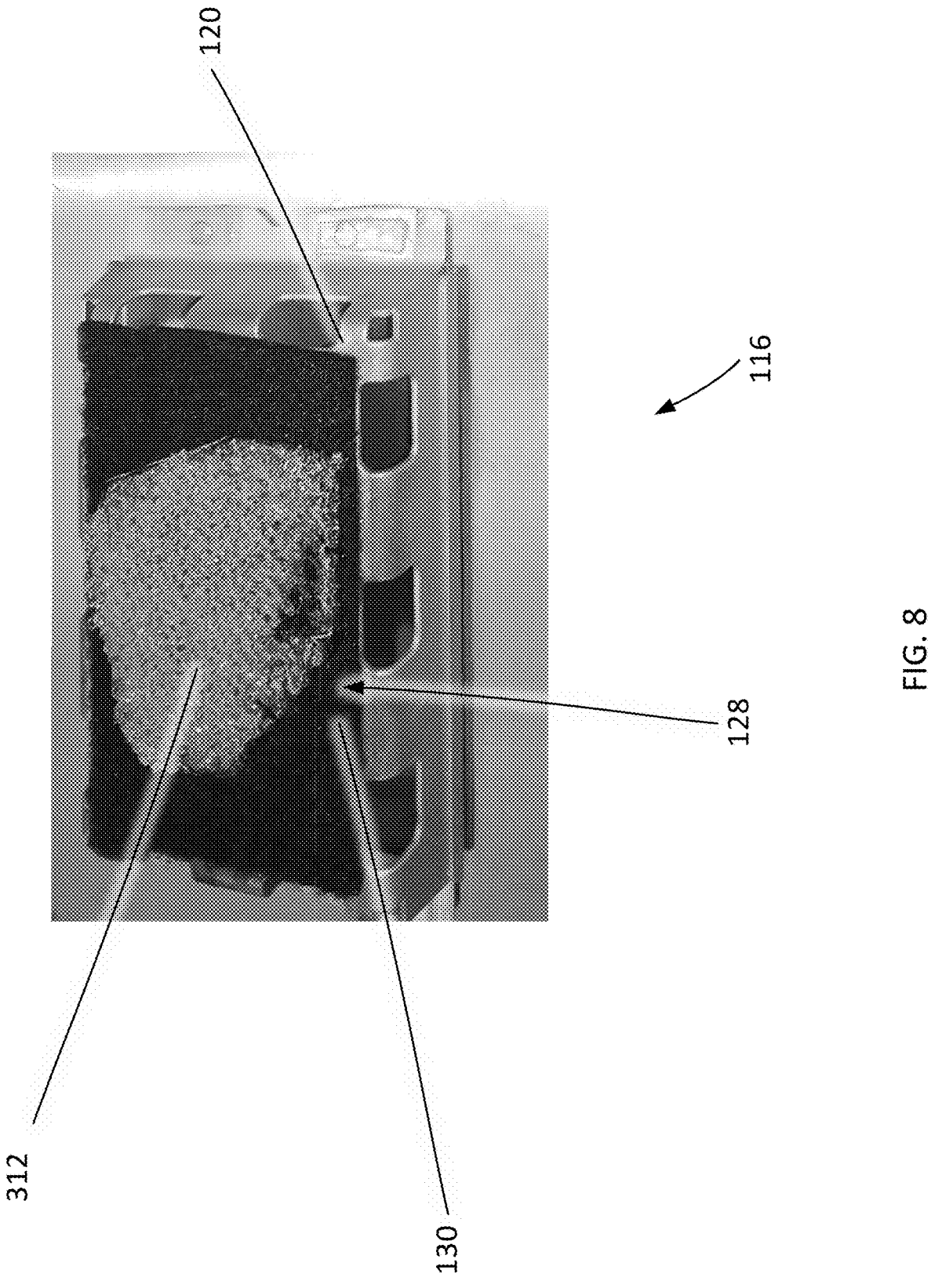
FIG. 8 is a perspective view of a 3D model printed on the platform of FIG. 4, according to one embodiment.
Figure 9:
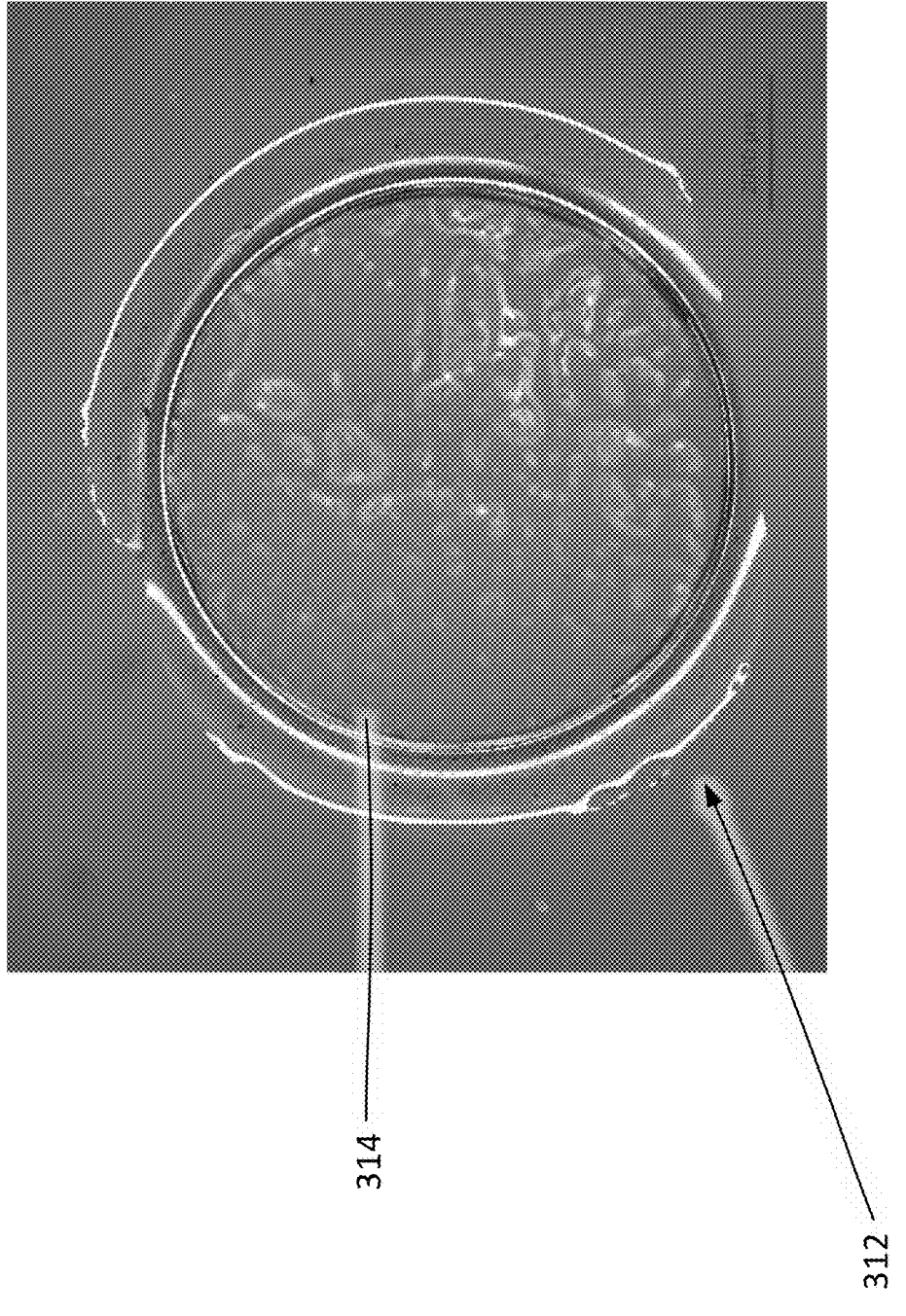
FIG. 9 is an illustration of a 3D model on a platform, according to one embodiment.

Referring to FIG. 8, a perspective view of a portion of the 3D model 312 printed on the platform 116, according to one embodiment. The portion of the 3D model 312 (e.g., a first layer of material, etc.) adheres to the print layer surface 130 as the printer head 104 causes the material to change from a liquid state to a solid state. In some embodiments, the portion of the 3D model is the first layer of the 3D model 312 formed on the platform. The first layer of the 3D model 312 adheres to the print layer surface 130. Referring to FIG. 9, the adhesion of the portion of 3D model 312 to the print layer is shown. As seen by the edge characteristic 314 of the 3D model 312, the adhesion of the 3D model 312 to the platform 116 is promoted. Specifically, the edge characteristic 314 is substantially smooth and defect free. This shows that as the 3D model 312 is being formed, the portion of the 3D model 312 adheres to the print layer surface 130 so as not to slide, move, shift, fall, etc. while the 3D model 312 is formed. The substantial adhesion of the portion of the 3D model 312 to the print layer facilitates a substantially defect free and accurate 3D model once the 3D model is formed. In some embodiments, the adhesion of the portion of the 3D model to the print layer is greater is than the adhesion of the material coupling to the portion of the 3D model 312. For example, as the 3D model 312 is being formed, a second layer of material is being formed on the portion of the 3D model 312 formed on the print layer 128 of the platform 116. As the second layer of material forms, there is a force applied to the portion of the 3D model 312. Due to the adhesion of the portion of the 3D model 312 to the print layer being greater than the force applied by the second layer, the portion of the 3D model 312 does not detach from the platform 116. In some embodiments, the portion of the 3D model 312 does not move, shift, slide, etc. due to the force applied.

Figure 10:
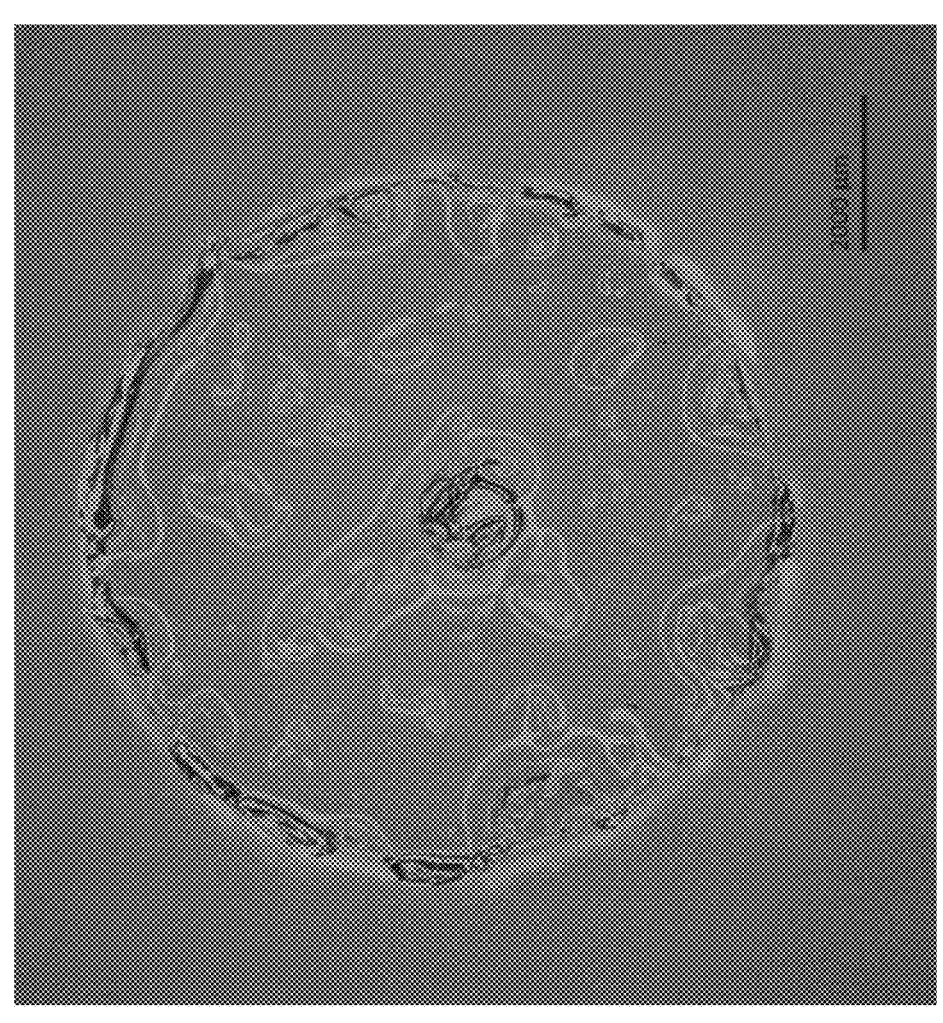
FIG. 10, is an illustration of a 3D model on a prior art platform.

In contrast, referring to FIG. 10, the adhesion of a 3D model to a ceramic platform 400 which exist currently is shown. As seen in FIG. 10, the edge of the 3D model on a ceramic platform is not substantially smooth. This is due to the adhesion of the 3D model to the platform being poor. For example, the 3D model begins to move and slide on the platform as the 3D model is being formed. Due to the poor adhesion, the 3D model formed may include substantial defects or may lead to failure of the formation of the 3D model.

Figure 11:
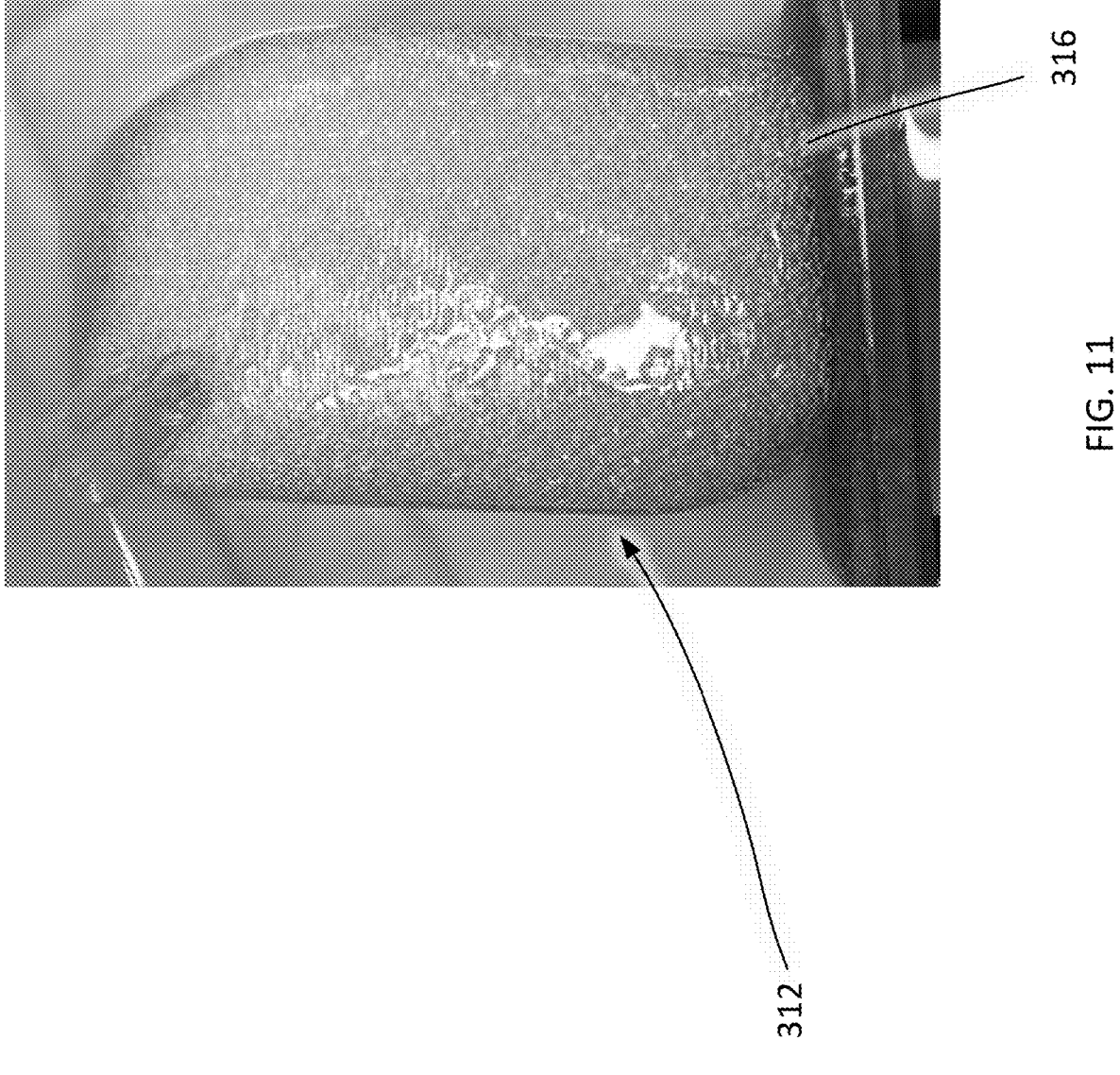
FIG. 11 is a perspective view of a 3D model.

Referring to FIG. 11, the 3D model 312 is shown. In an example embodiment, the 3D model is an artificial organ. The 3D model 312 includes an adhesion side 316 (e.g., outer surface, etc.). The adhesion side 316 couples the 3D model 312 to the print layer 128 of the platform 116. In some embodiments, the adhesion side 316 includes a surface roughness. The surface roughness may be substantially similar to the print layer surface roughness (e.g., second surface roughness, etc.). In some embodiments, the adhesion side 316 is a substantially smooth surface. In some embodiments, the surface roughness is determined by the following equation (equation 1):

$$\text{Surface Roughness} = \text{Surface thickness} \cdot \text{Cos}(\theta)/4 \qquad (1)$$

where the surface thickness is thickness of the layer which adheres to the print layer surface 130 and the angle, θ, is the angle at which the printer head 104 provides material. The surface thickness may be between a range of 16 micrometers (μm) and 30 μm, inclusive (e.g., 15.2 μm, 16 μm, 20 μm, 24 μm, 28 μm, 30 μm, 31.5 μm, etc.), and the angle may be between a range of 0° and 90°, inclusive (e.g., 0°, 15°, 30°, 45°, 60°, 75°, 90°, etc.). The surface roughness of the adhesion side 316 may be between a range of 0.5 microm-eters (μm) and 20 μm, inclusive (e.g., 0.475 μm, 0.5 μm, 1.0 μm, 5 μm, 10 μm, 15 μm, 20 μm, 21 μm, etc.).

The term "coupled" and the like, as used herein, mean the joining of two components directly or indirectly to one another. Such joining may be stationary (e.g., permanent) or moveable (e.g., removable or releasable). Such joining may be achieved with the two components or the two compo-nents and any additional intermediate components being integrally formed as a single unitary body with one another, with the two components, or with the two components and any additional intermediate components being attached to one another.

The terms "fluidly coupled to" and the like, as used herein, mean the two components or objects have a pathway formed between the two components or objects in which a fluid, such as air, gas, liquid, may flow, either with or without intervening components or objects.

It is important to note that the construction and arrange-ment of the various systems shown in the various example implementations is illustrative only and not restrictive in character. All changes and modifications that come within the spirit and/or scope of the described implementations are desired to be protected. It should be understood that some features may not be necessary, and implementations lacking the various features may be contemplated as within the scope of the disclosure, the scope being defined by the claims that follow. When the language "a portion" is used, the item can include a portion and/or the entire item unless specifically stated to the contrary.

Also, the term "or" is used, in the context of a list of elements, in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

Additionally, the use of ranges of values (e.g., W1 to W2, etc.) herein are inclusive of their maximum values and minimum values (e.g., W1 to W2 includes W1 and includes W2, etc.), unless otherwise indicated. Furthermore, a range of values (e.g., W1 to W2, etc.) does not necessarily require the inclusion of intermediate values within the range of values (e.g., W1 to W2 can include only W1 and W2, etc.), unless otherwise indicated.

Additional Embodiments

1. A platform for an apparatus for printing a 3D model, comprising:
   a base, a first side of the base having a first surface roughness thereon; and
   a print layer coupled to the first side of the base, a surface of the print layer distal from the base having a second surface roughness greater than the first surface roughness so as to promote adhesion of the 3D model being printed on the platform.

2. The platform of embodiment 1, wherein the base is formed from a metal.

3. The platform of embodiment 1, wherein one of either the first surface roughness or the second surface roughness comprises hooks and the other of the first surface roughness and the second surface roughness comprises loops, which adhere when pressed together.

4. The platform of embodiment 1, further comprising a mounting arm extending from a second side of the base that is opposite the first side.

5. The platform of embodiment 1, wherein the second surface roughness is between 50% to 300% greater than the first surface roughness.

6. The platform of embodiment 1, further comprising an adhesion layer interposed between the base and the print layer, the adhesion layer coupling the print layer to the base.

7. The platform of embodiment 4, further comprising a mounting structure coupled to the mounting arm at an end of the mounting arm distal from the base, the mounting struc-ture configured to couple the platform to the 3D printer assembly.

8. An apparatus for printing a 3D model, comprising:
   a 3D printer assembly comprising:
   a printer head configured utilize a material to print the 3D model;
   a vat configured to store the material utilized by the printer head;
   an actuator; and
   a platform mounting structure coupled to the actuator, the actuator configured to displace the platform mounting structure along an axis; and
   a platform coupled to the actuator via the platform mount-ing structure, the platform configured receive the material, the platform comprising:
   a base, a first side of the base having a first surface roughness thereon; and
   a print layer coupled to the first side of the base, a surface of the print layer distal from the base having a second surface roughness greater than the first surface rough-ness so as to promote adhesion of a model being 3D printed on the platform.

9. The apparatus for printing a 3D model of embodiment 8, wherein the platform further comprises:
   a mounting arm extending from a second side of the base opposite the first side of the base; and
   a mounting structure coupled to the mounting arm at an end of the mounting arm distal from the base, the mounting structure coupled to the platform mounting structure.

10. The apparatus for printing a 3D model of embodiment 8, wherein the first surface roughness and the second surface roughness comprise hooks or loops which adhere when pressed together.

11. The apparatus for printing a 3D model of embodiment 8 wherein in the platform further comprises an adhesion layer interposed between the base and the print layer, the adhesion layer coupling the print layer to the base.

12. The apparatus for printing a 3D model of embodiment 8, wherein the material stored in the vat is hydrogel.

13. The apparatus for printing a 3D model of embodiment 8, wherein the second surface roughness of the print layer is between 50% to 150% greater than the first surface roughness of the base.

14. The apparatus for printing a 3D model of embodiment 8, wherein the base is formed from metal.

15. A method of forming a 3D printed model comprising:
    providing a 3D printer assembly, the 3D printer assembly comprising:
        a printer head configured to utilize a material to print the 3D printed;
        a vat configured to store the material utilized by the printer head;
        an actuator; and
        a platform mounting structure operably coupled to the actuator, the actuator configured to displace the platform mounting structure along an axis;
    providing a platform comprising:
        a base, a first side of the base having a first surface roughness thereon; and
        a print layer coupled to the first side of the base, a surface of the print layer distal from the base having a second surface roughness greater than the first surface roughness so as to promote adhesion of a model being 3D printed on the platform;
    coupling the platform to the 3D printer assembly; and
    operating the 3D printer assembly such that the material couples to the platform to form a 3D model.

16. The method of embodiment 15, wherein the platform further comprises an adhesion layer interposed between the base and the print layer, the adhesion layer coupling the print layer to the base.

17. The method of embodiment 15 further comprising providing the material onto the print layer of the platform such that the adhesion between a first layer of material and the print layer is greater than a force of a second layer of material disposed on the first layer of material so as to prevent the first layer of material from detaching from the print layer.

18. The method of embodiment 15, wherein the 3D model formed comprises a roughness on an outer surface of the 3D model, the roughness substantially similar to the second surface roughness.

19. The method of embodiment 15, wherein the 3D model formed is an organ formed from hydrogel.

20. The method of embodiment 15, wherein the platform further comprises:
    a mounting arm extending from a second side of the base opposite the first side of the base; and a mounting structure coupled to the mounting arm at an end of the mounting arm distal from the base, the mounting structure coupled to the platform mounting structure.

Although the foregoing refers to particular preferred embodiments, it will be understood that the present invention is not so limited. It will occur to those of ordinary skill in the art that various modifications may be made to the disclosed embodiments and that such modifications are intended to be within the scope of the present invention.

All of the publications, patent applications and patents cited in this specification are incorporated herein by reference in their entirety.

What is claimed is:

1. A method of forming a 3D printed model comprising:
    providing an apparatus comprising:
        a vat with a photocurable ink, wherein a bottom of the vat comprises an oxygen permeable membrane; and
        a printing platform comprising:
            a base, and
            a mesh at a first side of the base, wherein the mesh is a mesh comprising hooks or loops for coupling the 3D printed model to the base, the mesh is a terminal element of the printing platform and an adhesion strength of the photocurable ink to the mesh is greater than an adhesion strength of the photocurable ink to the oxygen permeable membrane; and
    displacing the printing platform with the mesh contacting the photocurable ink from the oxygen permeable membrane to form a 3D model from the photocurable ink.

2. The method of claim 1, wherein the base is formed from a metal.

3. The method of claim 1, wherein the platform further comprises a mounting arm extending from a second side of the base that is opposite the first side.

4. The method of claim 1, wherein the platform further comprises an adhesion layer interposed between the base and the mesh, the adhesion layer couples the mesh to the base.

5. The method of claim 1, wherein the first side of the base has a surface roughness to promote attachment of the mesh to the base.

6. The method of claim 1, wherein the 3D model is a bioscaffold.

7. The method of claim 2, wherein the platform further comprises a mounting arm extending from a second side of the base that is opposite the first side.

8. The method of claim 2, wherein the wherein the platform further comprises an adhesion layer interposed between the base and the mesh, the adhesion layer couples the mesh to the base.

9. The method of claim 3, wherein the platform further comprises an adhesion layer interposed between the base and the mesh, the adhesion layer couples the mesh to the base.

10. The method of claim 2, wherein the first side of the base has a surface roughness to promote attachment of the mesh to the base.

11. The method of claim 3, wherein the first side of the base has a surface roughness to promote attachment of the mesh to the base.

12. The method of claim 4, wherein the first side of the base has a surface roughness to promote attachment of the mesh to the base.

13. The method of claim 2, wherein the 3D model is a bioscaffold.

14. The method of claim 3, wherein the 3D model is a bioscaffold.

15. The method of claim 4, wherein the 3D model is a bioscaffold.

16. The method of claim 5, wherein the 3D model is a bioscaffold.

* * * * *